April 14, 1959
H. RÜHLE
2,881,686
FOCUSING PLATE FOR PHOTOGRAPHIC CAMERAS
Filed Oct. 11, 1954
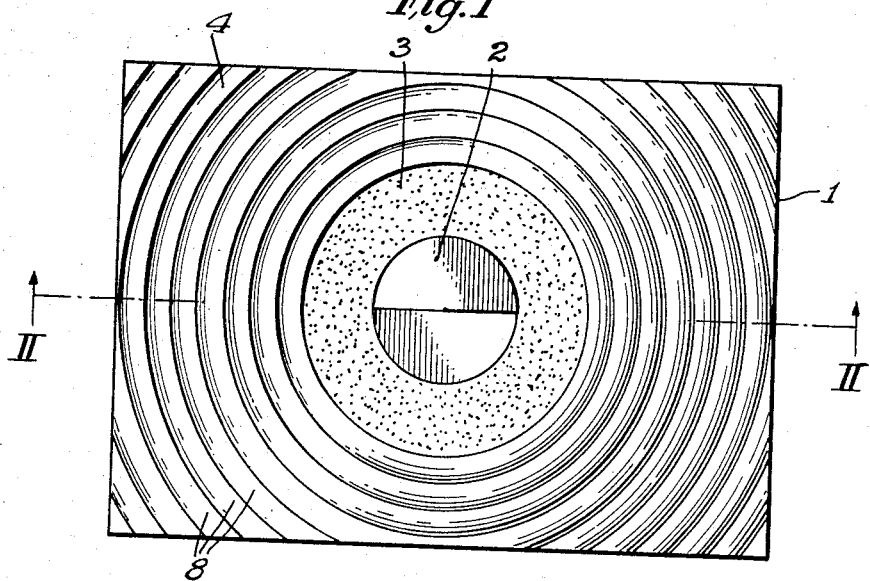
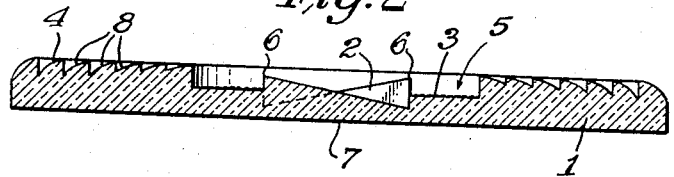
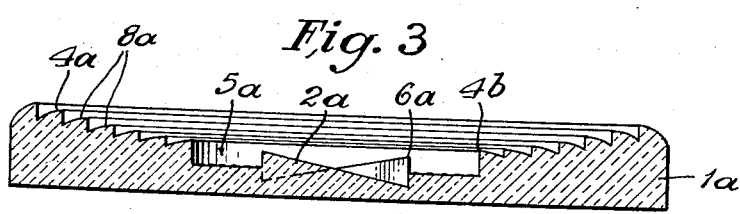
INVENTOR.
Hans Rühle

United States Patent Office 2,881,686
Patented Apr. 14, 1959

2,881,686
FOCUSING PLATE FOR PHOTOGRAPHIC CAMERAS

Hans Rühle, Stuttgart, Germany, assignor to Zeiss Ikon A.G. Stuttgart, Stuttgart, Germany Application October 11, 1954, Serial No. 461,597

Claims priority, application Germany October 10, 1953

3 Claims. (Cl. 95—44)

The invention relates to focusing plates for photographic cameras and particularly is directed to improvements in the focusing plate described in the copending patent application Serial No. 391,291 filed November 10, 1953.

The focusing plate described in the mentioned copending application is provided with a transparent portion, a frosted focusing portion and elements constituting a split image finder, for instance in the form of a pair of crosswise arranged optical wedge shaped prisms. For optical reasons, the mentioned prisms project at least in part in the form of projections from the upper surface of the transparent portion of the focusing plate, and furthermore, this upper surface, preferably constructed as a stepped lens (Fresnell lens), is arranged in the same plane with the frosted surface of the frosted focusing portion.

It is an object of the present invention to arrange the upper surface of the transparent portion of the focusing plate in a plane above the highest points of the optical wedges of the split image finder. For this purpose, the plane in which the frosted focusing portion is arranged constitutes the bottom of a recess arranged in the upper surface of the plate, and this bottom is parallel to the lower surface of the plate. On the bottom of the recess are arranged the elements constituting the split image finder—namely, a pair of cross-wise arranged optical wedges which are received completely in the recess so that no parts of the wedges extend beyond the upper surface of the transparent portion of the plate. In this manner the upwardly projecting points or portions of the optical wedges are arranged below the upper surface of the plate and are protected against injury and other damage to which they may be subjected during packing, storing or handling while the focusing plate is installed in a camera. The outwardly projecting portions of the wedges are also protected against accidental engagement with other portions and thereby they retain their optical accuracy at all times. The advantage of the mentioned construction of the new focusing plate is that in view of the recessed arrangement of the optical wedges, the entire focusing plate may be produced by a molding or pressing operation. In fact, the entire focusing plate, including the steps on the transparent portion and the frosted surface on the focusing portion may be made from a relatively thin glass-like plastic sheet in a single pressing operation.

The above mentioned object and other objects of the invention will be more specifically described and pointed out in the following description forming a part of this specification. The following description refers to a few preferred embodiments of the invention, but it is believed to be obvious that the invention may be practiced in additional other forms within the scope of the claims.

Fig. 1 is a top plan view of a focusing plate of the invention.

Fig. 2 is a cross-sectional view of the focusing plate along the lines II—II of Fig. 1 and Fig. 3 shows a cross-sectional view of a focusing plate of a modified construction.

Referring to the drawing, the central elements forming a split image finder have the form of two cross-wise arranged optical wedges 2, which according to Fig. 1 are arranged in the center of the plate 1 and have a circular perimeter. The two mentioned wedges 2 are surrounded by an annular frosted surface 3 which forms the bottom of a circular recess 5 arranged in the upper surface of the plate 1. The bottom 3 of the recess 5 is parallel to the lower surface 7 of the plate 1. The upper surface 4 of the transparent plate 1 is constructed in the form of a stepped lens (Fresnell lens), the individual steps 8 of which are arranged concentric with respect to the circular recess 5. The highest point of the surface 4 is arranged in a plane above the highest points 6 or edges of the optical wedges 4, as illustrated in Fig. 2.

In Fig. 2 all of the highest points of the steps are arranged in a single plane arranged parallel to the lower surface 7 of the plate 1.

Fig. 3 illustrates a modified embodiment in which the upper surface 4a of the plate 1a is somewhat concave. It would also be possible to make the upper surface of the plate 1 convex. It will be noted that according to Fig. 3, the inner circular edge 4b, which forms the outer perimeter of the recess 5a, is arranged in a plane above the highest projections 6a of the wedges 2a, which are arranged on the bottom of the recess 5a and are formed integral with the plate 1a.

In the last described embodiment, it will be noted that owing to the concave upper surface 4a, all the upper edges of the steps 8a are likewise protected against accidental engagement with exterior objects so that the wedges 2a and the steps 8a will retain their optical accuracy.

What I claim is:

1. A focusing plate for photographic cameras, comprising a rectangular transparent plate provided with an uninterrupted plane lower surface and provided in its upper surface with a central circular recess, the bottom of which is parallel to the lower plane surface of the plate and spaced inwardly from the top surface of said plate, split image range finder means comprising two crosswise and horizontally positioned prisms formed integral with said plate at the bottom of said recess, said two prisms together occupying a circular area at the center of said circular recess and spaced below the circular wall of said recess, said circular area being smaller in diameter than the diameter of said circular recess, thereby forming an annular area around said two prisms which is frosted to serve as a focusing screen, the section line between said two prisms lying in the plane of said frosted annular area, the upper surface of said plate being positioned in a plane above the highest points of the prisms projecting from the bottom of said recess.

2. A focusing plate for photographic cameras, comprising a rectangular transparent plate provided with an uninterrupted plane lower surface and provided in its upper surface with a central circular recess, the bottom of which is parallel to the lower plane surface of the plate and spaced inwardly from the top surface of said plate, split image range finder means comprising two crosswise and horizontally positioned prisms formed integral with said plate at the bottom of said recess, said two prisms together occupying a circular area at the center of said circular recess, said circular area being smaller in diameter than the diameter of said circular recess, thereby forming an annular area around said two prisms which is frosted to serve as a focusing screen, the section line between said two prisms lying in the plane of said frosted annular area, the upper surface of said plate being provided with circular steps concentric with respect to said circular recess and forming a stepped lens, the surface within which the highest points of said steps are positioned being arranged at a level above the highest points of the prisms at the bottom of said annular recess.

3. A focusing plate for photographic cameras, comprising a rectangular transparent plate provided with an uninterrupted plane lower surface and provided in its upper surface with a central circular recess, the bottom of which is parallel to the lower plane surface of the plate and spaced inwardly from the top surface of said plate, split image range finder means comprising two crosswise and horizontally positioned prisms formed integral with said plate at the bottom of said recess, said two prisms together occupying a circular area at the center of said circular recess, said circular area being smaller in diameter than the diameter of said circular recess, thereby forming an annular area around said two prisms which is frosted to serve as a focusing screen, the section line between said two prisms lying in the plane of said frosted annular area, the upper surface of said plate being generally concave and being provided with circular steps concentric with respect to said circular recess and forming a stepped lens the lowest point of said generally concave surface within which said steps are positioned is arranged at a level above the highest points of the prisms at the bottom of said annular recess.

References Cited in the file of this patent

UNITED STATES PATENTS

| | | |
|---|---|---|
| 886,739 | Thorner | May 5, 1908 |
| 1,572,236 | Fredrick | Feb. 9, 1926 |
| 2,341,410 | Mihalyi | Feb. 8, 1944 |

FOREIGN PATENTS

| | | |
|---|---|---|
| 850,264 | Germany | Sept. 22, 1952 |
| 681,928 | Great Britain | Oct. 29, 1952 |

OTHER REFERENCES

Dodin: Article, "Focusing With Crossed Prisms," published in Amateur Photographer, April 10, 1946, pp. 243 and 245.